United States Patent
Hanabusa et al.

(10) Patent No.: US 6,433,045 B1
(45) Date of Patent: Aug. 13, 2002

(54) FLAME-RETARDANT THERMOPLASTIC POLYESTER RESIN COMPOSITION

(75) Inventors: Kazuhito Hanabusa; Mitsunori Matsushima, both of Fuji (JP)

(73) Assignee: Polyplastics Co., Ltd. (JP)

( * ) Notice: Subject to any disclaimer, the term of this patent is extended or adjusted under 35 U.S.C. 154(b) by 0 days.

(21) Appl. No.: 09/214,497

(22) PCT Filed: Jun. 15, 1998

(86) PCT No.: PCT/JP98/02625

§ 371 (c)(1),
(2), (4) Date: Dec. 30, 1998

(87) PCT Pub. No.: WO98/56857

PCT Pub. Date: Dec. 17, 1998

(30) Foreign Application Priority Data

Jun. 13, 1997 (JP) .............................. 9-156533

(51) Int. Cl.⁷ ................................ C08K 5/34
(52) U.S. Cl. ................ 524/100; 524/139; 523/179
(58) Field of Search ................ 524/139, 100, 524/101; 523/179

(56) References Cited

U.S. PATENT DOCUMENTS

| | | | | |
|---|---|---|---|---|
| 5,684,071 A | * | 11/1997 | Mogami et al. | 524/100 |
| 5,780,534 A | * | 7/1998 | Kleiner et al. | 524/133 |
| 6,365,071 B1 | * | 2/2002 | Jenewein | 252/609 |

FOREIGN PATENT DOCUMENTS

| | | | |
|---|---|---|---|
| JP | A 48-91147 | | 11/1973 |
| JP | A 55-5979 | | 1/1980 |
| JP | A 55-7878 | | 1/1980 |
| JP | A 55-82149 | | 6/1980 |
| JP | A 60-127388 | | 7/1985 |
| JP | 63165138 | * | 7/1988 |
| JP | A 3-215564 | | 9/1991 |
| JP | A 3-281652 | | 12/1991 |
| JP | A 5-247261 | | 9/1993 |
| JP | A 5-331375 | | 12/1993 |
| JP | A 49-74736 | | 7/1994 |
| JP | A 8-73720 | | 3/1996 |
| JP | A 9-241395 | | 9/1997 |
| JP | A 9-278784 | | 10/1997 |
| JP | A 10-114856 | | 5/1998 |
| WO | 9739053 | * | 10/1997 |

* cited by examiner

*Primary Examiner*—Cephia D. Toomer
(74) *Attorney, Agent, or Firm*—Nixon & Vanderhye P.C.

(57) ABSTRACT

To provide a flame-retardant thermoplastic polyester resin composition having excellent flame-retarding properties even without any halogen flame retardant, and also good mechanical properties and moldability and an excellent heat residence stability. The composition comprises (A) 100 parts by weight of a thermoplastic polyester resin, (B) 5 to 40 parts by weight of a specific phosphinic acid salt and/or a specific diphosphinic acid salt and/or a polymer thereof, and (C) 1 to 35 parts by weight of a nitrogen-containing organic substance.

4 Claims, No Drawings

FLAME-RETARDANT THERMOPLASTIC POLYESTER RESIN COMPOSITION

This application is a 371 of PCT/JP98/02625, filed Jun. 15, 1998.

BACKGROUND OF THE INVENTION

1. Technical Field of the Invention

The present invention relates to a flame-retardant thermoplastic polyester resin composition having excellent flame-retarding properties even without any halogen flame retardant, and a process for producing it. In particular, the present invention relates to a flame-retardant resin composition having excellent flame-retarding properties, and also good mechanical properties and moldability, and an excellent heat residence stability or melt stability, and a process for producing it.

2. Prior Arts

Thermoplastic polyester resins having excellent characteristics are widely used as materials for parts of electric and electronic appliances and also parts of automobiles. Particularly in the fields of electric and electronic appliances, flame-retardancy is often imparted to them so as to insure the safety from a fire.

Usually a halogen flame-retardant is used for imparting the flame retardancy to the thermoplastic polyester resins. However, when the halogen flame-retardant is used, a halogen compound contained as an impurity therein or formed as a thermal decomposition product thereof may corrode a kneader, molding machine, mold, etc. in the kneading and molding steps. In addition, some of the halogen flame-retardants form a poisonous gas even in a very small amount when they are decomposed.

A method for[]improving the flame retardancy by adding red phosphorus or a phosphoric acid compound to solve the above-described problem is known (see, for example, JP-A 55-82149 and JP-A 48-91147). However, the effect of improving the flame retardancy was yet insufficient even when such a flame retardant is used, and it was impossible to obtain V-0 rank in UL. A method for solving this problem by using a specified calcium or aluminum salt of phosphinic acid was proposed (JP-A 8-73720). However, even this compound has a problem that it must be added in a large amount for obtaining the excellent flame retardancy and, as a result, the moldability of the polyester is impaired.

SUMMARY OF THE INVENTION

After investigations made for the purpose of obtaining excellent flame retardancy and also mechanical properties and moldability of the thermoplastic polyester at a reasonable cost without using the halogen flame-retardant, the inventors have. found that an excellent flame-retardancy can be obtained by adding a small amount of a nitrogen compound. The present invention has been completed on the basis of this finding.

Namely, the present invention relates to a flame-retardant thermoplastic polyester resin composition comprising:
(A) 100 parts by weight of a thermoplastic polyester. resin compounded with:
(B) 5 to 40 parts by weight of a phosphinic acid salt represented by the formula (1) and/or a diphosphinic acid salt represented by the formula (2) and/or a polymer thereof, and
(C) 1 to 35 parts by weight of a nitrogen-containing, organic substance:

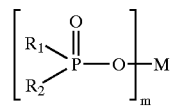

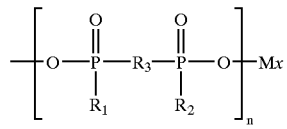

wherein $R_1$ and $R_2$ each represent a linear or branched $C_1$ to $C_6$ alkyl or phenyl group, $R_3$ represents a linear or branched $C_1$ to $C_{10}$ alkylene, an arylene, an alkylarylene or an arylalkylene group, M represents a calcium ion or an aluminum; ion, m represents 2 or 3, n represents 1 or 3 and X represents 1 or 2.

In other words, the composition comprises (A), (B) and (C).

(B) is at least one of (1), (2) and a polymer thereof. It is preferable that the nitrogen-containing organic substance (C) is a nitrogen-containing condensate or a salt of an amino-having, nitrogen-containing compound and an acid.

DETAILED DESCRIPTION OF THE INVENTION

The detailed description will be made on the respective constituents of the resin composition of the present invention.

The thermoplastic polyester resin (A) which is the base resin of the present invention is a polyester obtained by the polycondensation of a dicarboxylic acid compound with a dihydroxy compound, polycondensation of a hydroxycarboxylic acid compound or polycondensation of these three compounds. The effect of the present invention can be obtained when the polyester is either a homopolyester or copolyester.

Examples of the dicarboxylic acid compounds constituting the thermoplastic polyester resin used herein include known dicarboxylic acid compounds such as terephthalic acid, isophthalic acid, naphthalene-dicarboxylic acid, diphenyldicarboxylic acid, diphenyl ether dicarboxylic acid, diphenylethanedicarboxylic acid, cyclohexanedicarboxylic acid, adipic acid and sebacic acid, as well as those substituted with an alkyl, alkoxy or halogen. These dicarboxylic acid compounds are usable also in the form of an ester-forming derivative thereof such as a lower alcohol ester, e.g. dimethyl ester, thereof.

Examples of the dihydroxy compounds constituting the polyester (A) of the present invention include dihydroxy compounds such as ethylene glycol, propylene glycol, butanediol, neopentyl glycol, hydroquinone, resorcinol, dihydroxyphenyl, naphthalenediol, dihydroxydiphenyl ether, cyclohexanediol, 2, 2-bis(4hydroxyphenyl) propane and diethoxylated bisphenol A; polyoxyalkylene glycols and those substituted with an alkyl, alkoxy or halogen. They are used singly or in the form of a mixture of two or more of them.

Examples of the hydroxycarboxylic acids include hydroxybenzoic acid, hydroxynaphthoic acid and hydroxycarboxylic acids such as diphenylenehydroxycarboxylic acids, as well as those substituted with an alkyl, alkoxy or halogen. Further, ester-forming derivatives of these compounds are also usable. One or more of these compounds are usable in the present invention.

The polyesters may have a branched or crosslinked structure formed by using a small amount of a trifunctional monomer such as trimellitic acid, trimesic acid, pyromellitic acid, pentaerythritol or trimethylolpropane.

Any of the thermoplastic polyesters formed by the polycondensation of the above-described compound as the monomer component is usable as the component (A) in the present invention. The monomer components are usable either singly or in the form of a mixture of two or more of them. The copolymers comprise, as the main component, preferably a polyalkylene terephthalate, still preferably a polybutylene terephthalate and/or polyethylene terephthalate.

In the present invention, the thermoplastic polyesters may be those modified by a known crosslinking method or graft polymerization method.

The thermoplastic polyesters usable in the present invention are those having an intrinsic viscosity of 0.5 to 1.3 dl/g. From the viewpoints of the moldability and mechanical properties, those having an intrinsic viscosity in the range of 0.65 to 1.1 dl/g are preferred. When the intrinsic viscosity is lower than 0.5 dl/g, the mechanical strength is extremely lowered and, on the contrary, when it is higher than 1.3 dl/g, the flowability of the resin is low to reduce the moldability.

The compounds used as the component (B) in the present invention include phosphinic acid salts of the formula (1) and/or diphosphinic acid salts of the formula (2) and/or polymers thereof:

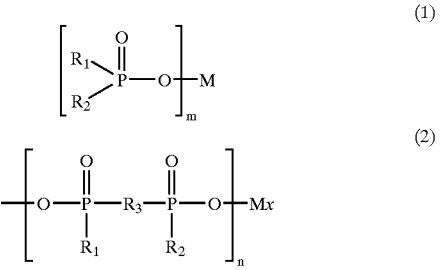

wherein $R_1$ and $R_2$ each represent a linear or branched $C_1$ to $C_6$ alkyl or phenyl group, $R_3$ represents a linear or branched $C_1$ to $C_{10}$ alkylene, an arylene, an alkylarylene or an arylalkylene group, M represents a calcium ion or an aluminum ion, m represents 2 or 3, n represents 1 or 3, and X represents 1 or 2.

One or more of these compounds are used in the present invention.

In the present invention, 5 to 40 parts by weight of the compounds (B) can be added to 100 parts by weight of the thermoplastic polyester (A). When the amount of the compound (B) is below 5 parts by weight, the intended high flame-retardancy cannot be obtained and, on the contrary, when it is above 40 parts by weight, the mechanical properties are impaired and the material cost becomes too high and impractical. From the viewpoints of the cost and flame-retardancy, the amount is particularly preferably in the range of 7 to 35 parts by weight.

Examples of the nitrogen-containing organic compounds usable as the component (C) in the present invention include the following compounds: ① compounds of the formula (3):

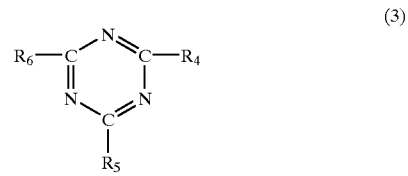

wherein $R_4$, $R_5$ and $R_6$ may be the same as or different from each other and represent a hydrogen atom, an amino group, an aryl group or an oxyalkyl group having 1 to 3 carbon atoms, ② salts of a compound of the formula (4) and an

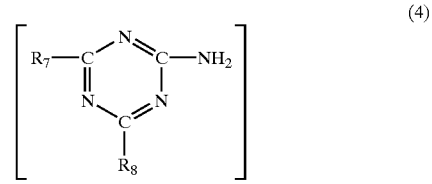

wherein $R_7$ and $R_8$ may be the same as or different from each other and represent a hydrogen atom, an amino group, an aryl group or an oxyalkyl group having 1 to 3 carbon atoms, and ③ polycondensates of a compound of the formula (5) and formaldehyde:

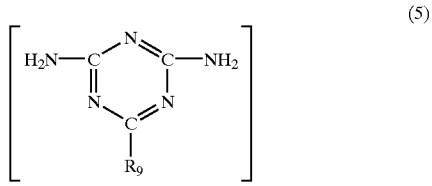

wherein $R_9$ represents a hydrogen atom, an amino group, an aryl group or an oxyalkyl group having 1 to 3 carbon atoms.

The compounds ①, ② and ③ are typified by ① melamine, ② melamine cyanurate and melamine borate and ③ a polycondensate of melamine and formaldehyde, respectively.

These compounds are used either solely or in combination of two or more of them in the present invention.

The most preferable component (C) is a nitrogen-containing condensate, in particular ③ a polycondensate of the compound having the formula (5) and formaldehyde, more in detail a condensate of melamine and formaldehyde. Use of melamine may happen to reduce a stability to thermal residence or a melt stability, but use of a melamine-formaldehyde condensate can provide an improved stability to heat residence and melt stability and improved properties in balance to a resulting composition.

In the present invention, 1 to 35 parts by weight of the compound (C) can be added to 100 parts by weight of the thermoplastic polyester (A). When the amount of the compound (C) is below 1 part by weight, the component (B) must be used in a large amount and, on the contrary, when it is above 35 parts by weight, the mechanical properties are impaired. An amount of 3 to 25 parts by weight of the nitrogen-containing condensate or a salt of an amino-having, nitrogen-containing compound and an acid is preferable for stability to heat residence or retention and melt stability.

In the present invention, an amorphous thermoplastic resin can also be added to the composition, so far as the characteristic features of the thermoplastic polyester are not damaged, for the purpose of improving the dimensional stability of the moldings and reducing warp deformation. Although the amorphous resins usable for this purpose are not particularly limited, the following resins are preferred from the viewpoints of the thermal stability and dimensional stability: polycarbonate resins; copolymer resins comprising styrene, butadiene and acrylonitrile and copolymer resins comprising styrene, an acrylic ester and/or methacrylic ester and acrylonitrile.

The amount of this kind of resin is preferably such that the properties of the flame-retardant polyester resin composition of the present invention are not impaired, i.e. not more than 45 parts by weight for 100 parts by weight of the component (A).

The flame-retardant resin material of the present invention can also contain another assistant thermoplastic resin in addition to the above-described components depending on the purpose. Other thermoplastic resins usable herein may be any resins stable at a high temperature. Examples of them include polyamides, polyphenylene sulfides, polyphenylene oxides, polyacetals, polysulfones, polyethersulfones,; polyetherimides, polyetherketones and fluororesins. These thermoplastic resins are usable also in the form of a mixture of two or more of them. A fluorine resin or a fluoro resin is preferably added as an inhibitor to dripping of the polyester composition because the thermoplastic polyester early drips on burning.

The flame-retardant resin material of the present invention can contain, in addition to the above-described components, a fibrous, granular or platy filler depending on the purpose so as to obtain the moldings excellent in the mechanical strength, thermal resistance, dimensional stability (resistance to deformation and warp) and electric properties.

The fibrous fillers include inorganic fibrous substances such as glass, carbon, silica, silica/ alumina, zirconia, boron nitride, silicon nitride, boron and potassium titanate fibers; and fibrous metals, e.g. fibrous stainless steel, aluminum, titanium, copper and brass. Particularly typical fibrous fillers are glass fibers and carbon fibers.

The granular fillers include carbon black; silica, quartz powder, glass beads, glass powder, silicates such as calcium silicate, aluminum silicate, kaolin, talc, clay, diatomaceous earth and wollastonite; metal oxides such as iron oxides, titanium oxides, zinc oxides and alumina; metal carbonates such as calcium carbonate and magnesium carbonate; metal sulfates such as calcium sulfate and barium sulfate; and silicon carbide, silicon nitride, boron nitride and various metal powders. The platy fillers include mica, glass flakes and various metal. foils.

The inorganic fillers can be used either singly or in combination of two or more of them. The fibrous filler, particularly the combination of a glass fiber with a powdery and/or platy filler, is desirable for obtaining excellent mechanical strength, dimensional accuracy, electric properties, etc.

In using these fillers, it is desirable to use a binder or surface treating agent, if necessary. Examples of the binders and surface treating agents include functional compounds such as epoxy compounds, isocyanate compounds, silane compounds and titanate compounds. These compounds are used for the previous surface treatment or binding of the fillers or, alternatively, they are added when the material is prepared.

The amount of the inorganic filler is 0 to 150 parts by weight, preferably 5 to 100 parts by weight, for 100 parts by weight of the polyester resin (A) in the present invention. When the amount of the inorganic filler exceeds 150 parts by weight, the molding process becomes difficult and a problem is caused in the mechanical strength of the moldings. The amount of the functional surface treating agent is 0 to 10% by weight, preferably 0.05 to 5% by weight, based on the inorganic filler.

The thermoplastic resin material of the present invention can contain known substances usually added to thermoplastic resins and thermosetting resins in order to impart desired properties depending on the purpose thereto, such as stabilizers, e.g. antioxidants and ultraviolet absorbers, antistatic agents, flame retardants, colorants, e.g. dyes and pigments, lubricating agents, crystallization accelerators and nucleating agents.

The thermoplastic resin material of the present invention can be easily prepared by a process and with an apparatus usually employed for the preparation of resin compositions in the prior art. For example, the material can be prepared by 1) a process wherein the components are mixed together, the resultant mixture is kneaded and extruded with a single-screw extruder or twin-screw extruder to form pellets and then the material is prepared from the pellets, 2) a process wherein pellets having different compositions are once prepared, predetermined amounts of the pellets are mixed-together, and the resultant mixture is molded to obtain the moldings having the intended composition, or 3) a process wherein one or more of the components are directly fed into the molding machine. Further, it is preferred that a part of the resin components is finely pulverized before mixing it with other components in order to obtain the homogeneous mixture of the components.

EXAMPLES

The following Examples will further illustrate the present invention, which by no means limit the invention so far as they do not change the gist. In the Examples, the properties were determined by methods described below.

① Tensile Strength and Elongation

The tensile strength and tensile elongation were determined according to ASTM D-638.

② Stability to Heat Residence and Melt Stability

A test resin is measured and is made reside for 30 minutes at a cylinder temperature of 260° C., or 280° C. for polyethylene terephthalate, in a molder, IS 80 of Toshiba Kikai Co., Ltd. It is molded into a tensile strength test piece and a tensile strength thereof is determined according to ASTM D-638 for stability to heat residence or melt stability.

③ Combustibility Test (UL-94)

The combustibility and dripping properties of the resin were tested using 5 test pieces (thickness: 1/32 inch) according to the method of Subject 94 (UL 94) of Underwriters Laboratories Inc. ④ Deflection Temperature Under Load:

The deflection temperature under load was determined according to ASTM D-648. Examples 1 to 10 and Comparative Examples 1 to 9

The materials shown in "Examples" in Tables 1 and 3 and also in "Comparative Examples" in Tables 2 and 4 were produced from the materials having the properties shown in Table 5. The properties of the obtained materials were evaluated to obtain the results given in the Tables. The materials were produced as shown below.

<Method for Synthesizing Phosphinic Acid Compounds>

Production of aluminum 1,2-ethylmethylphosphinate (B-1)

2106 g (19.5 mol) of ethylmethylphosphinic acid was dissolved in 6.5 l of water. 507 g (6.5 mol) of aluminum hydroxide was added to the obtained solution under vigorous stirring. The mixture thus obtained was heated to 85° C.

The mixture was then stirred at 80 to 90° C. for 65 h in total, then cooled to 60° C. and filtered by suction. After drying the mixture in a vacuum drying cabinet at 120° C. until the mass had become constant, 2140 g of a fine powder which was not molten at a temperature of 300° C. or below was obtained. Yield: 95% based on the theoretical yield.

Production of calcium 1,3-ethane-1,2-bismethylphosphinate (B-2)

325.5 g (1.75 mol) of ethane-1,2-bismethyl-phosphinic acid was dissolved in 500 ml of water. 129.5 g (1.75 mol) of calcium hydroxide was added to the resultant solution under vigorous stirring for a period of 1 h. The obtained mixture was stirred at 90 to 95° C. for several hours, cooled and filtered by suction. The product thus obtained was dried in a vacuum drying cabinet at 150° C. to obtain 335 g of the intended product which was not molten at a temperature of 380° C. or below. Yield: 85% based on the theoretical yield.

Other resins and nitrogen compounds used in the Examples and Comparative Examples are given in Table 5.

<Process for Producing Pellets>

Predetermined amounts of the components (B) and (C) and the fluoro resin were incorporated into the polyester resin (A), and they were homogeneously mixed with a V blender. The obtained mixture was melt-kneaded with a 30 mm φ 4 twin-screw extruder at a barrel temperature of 260° C. while side-feeding a predetermined amount of a glass fiber. Strands discharged through the die were cooled and cut to obtain pellets.

TABLE 1

| Ex. | 1 | 2 | 3 | 4 | 5 | 6 | 7 | 8 |
|---|---|---|---|---|---|---|---|---|
| Thermoplastic polyester resin (A) | PBT1 | PBT1 | PBT1 | PBT1 | PBT1 | PBT1 | PET1 | PET1 |
| (wt. parts) | 100 | 100 | 100 | 100 | 100 | 100 | 100 | 100 |
| Phosphinic acid, diphosphinic acid compound (B) | B-2 | B-2 | B-1 | B-1 | B-1 | B-1 | B-1 | B-2 |
| (wt. parts) | 12 | 10 | 8 | 12 | 5 | 15 | 10 | 9 |
| Nitrogen compound (C) | C-2 | C-2 | C-3 | C-3 | C-4 | C-1 | C-2 | C-2 |
| (wt. parts) | 5 | 10 | 25 | 5 | 15 | 2 | 10 | 3 |
| Fluoro resin | | | | | | | | 0.8 |
| UL-94 | V-0 | V-0 | V-0 | V-0 | V-0 | V-0 | V-0 | V-0 |
| Tensile strength (MPa) | 48 | 50 | 54 | 49 | 48 | 51 | 53 | 47 |
| Tensile strength after heat retention (MPa) | 47 | 51 | 53 | 47 | 46 | 38 | 53 | 48 |

TABLE 2

| Com. Ex. | 1 | 2 | 3 | 4 | 5 | 6 |
|---|---|---|---|---|---|---|
| Thermoplastic polyester resin (A) | PBT1 | PBT1 | PBT1 | PET1 | PBT1 | PBT1 |
| (wt. parts) | 100 | 100 | 100 | 100 | 100 | 100 |
| Phosphinic acid, diphosphinic acid compound (B) | — | B-1 | B-2 | B-1 | — | B-1 |
| (wt. parts) | | 15 | 15 | 20 | | 8 |
| Nitrogen compound (C) | — | — | C-1 | — | C-2 | C-2 |
| (wt. parts) | | | 0.5 | | 35 | 40 |
| UL-94 | HB | V-2 | V-2 | V-2 | HB | V-0 |
| Tensile strength (MPa) | 50 | 49 | 51 | 54 | 39 | 36 |
| Tensile strength after heat retention (MPa) | 51 | 49 | 42 | 53 | 32 | 30 |

TABLE 3

| Ex. | 9 | 10 |
|---|---|---|
| Thermoplastic polyester resin (A) | PBT1 | PBT2 |
| (wt. parts) | 100 | 100 |
| Phosphinic acid, diphosphinic acid compound (B) | B-1 | B-1 |
| (wt. parts) | 20 | 25 |
| Nitrogen compound (C) | C-2 | C-4 |
| (wt. parts) | 10 | 20 |
| Glass fiber (wt. parts) | 60 | 60 |
| UL-94 | V-0 | V-0 |
| Tensile strength (MPa) | 142 | 156 |
| Tensile strength after heat retention (MPa) | 138 | 145 |
| Deflection temp. under load (° C.) | 220 | 248 |

TABLE 4

| Com. Ex. | 7 | 8 | 9 |
|---|---|---|---|
| Thermoplastic polyester resin (A) | PBT2 | PET2 | PBT2 |
| (wt. parts) | 100 | 100 | 100 |
| Phosphinic acid, diphosphinic acid compound (B) | B-1 | B-1 | B-2 |
| (wt. parts) | 20 | 25 | 50 |
| Nitrogen compound (C) | — | C-2 | — |
| (wt. parts) | | 50 | |
| Glass fiber (wt. parts) | 60 | 60 | 60 |
| UL-94 | V-2 | V-0 | V-0 |
| Tensile strength (MPa) | 158 | 115 | 142 |
| Tensile strength after heat retention (MPa) | 148 | 98 | 139 |
| Deflection temp. under load (° C.) | 219 | 248 | 220 |

TABLE 5

| (A) | PBT1 | polybutylene terephthalate having limiting viscosity of 1.0 dl/g |
| | PBT2 | polybutylene terephthalate having limiting viscosity of 0.7 dl/g |
| | PET1 | polyethylene terephthalate having limiting viscosity of 0.8 dl/g |
| | PET2 | polyethylene terephthalate having limiting viscosity of 0.5 dl/g |
| (C) | C-1 | melamine (a product of Wako Pure Chemical Industries, Ltd.) |
| | C-2 | melamine cyanurate (MC-610; a product of Nissan Chemical Industries, Ltd.) |
| | C-3 | melamine borate |
| | C-4 | melamine/formaldehyde condensate |
| Fluoro resin | | Polytetrafluoroethylene |

What is claimed is:

1. A flame-retardant thermoplastic polyester resin composition comprising:

(A) 100 parts by weight of a thermoplastic polyester resin having an intrinsic viscosity of 0.5 to 1.3 dl/g which is at least one selected from the group consisting of polyethylene terephthalate and polybutylene terephthalate;

(B) 5 to 40 parts by weight of a phosphinic acid salt which is at least one selected from the group consisting of aluminum 1,2-ethylmethylphosphinate and calcium 1,3-ethane-1,2-bismethylphosphinate; and (C) 1 to 35 parts by weight of a nitrogen-containing compound which is a polycondensate of melamine and formaldehyde.

2. A flame-retardant thermoplastic polyester resin composition comprising:

(A) 100 parts by weight of a thermoplastic polyester resin;

(B) 5 to 40 parts by weight of at least one of a phosphinic acid salt represented by the formula (1), a diphosphinic acid salt represented by the formula (2) and polymers thereof;

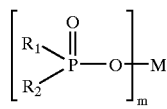

(1)

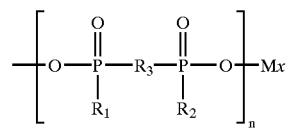

(2)

wherein $R_1$ and $R_2$ each represent a linear or branched $C_1$ to $C_6$ alkyl or phenyl group, $R_3$ represents a linear or branched $C_1$ to $C_{10}$ alkylene, an arylene, an alkylarylene or an arylalkylene group, M represents a calcium ion or an aluminum ion, m represents 2 or 3, n represents 1 or 3 and X represents 1 or 2; and (C) 1 to 35 parts by weight of a nitrogen-containing organic substance which is a polycondensate of melamine and formaldehyde.

3. The composition of claim 2, wherein the thermoplastic polyester resin (A) is a polybutylene terephthalate resin having an intrinsic viscosity of 0.5 to 1.3 dl/g.

4. The composition of claim 2, wherein the thermoplastic polyester resin (A) is a polyethylene terephthalate resin having an intrinsic viscosity of 0.5 to 1.3 dl/g.

* * * * *